Patented Apr. 29, 1924.

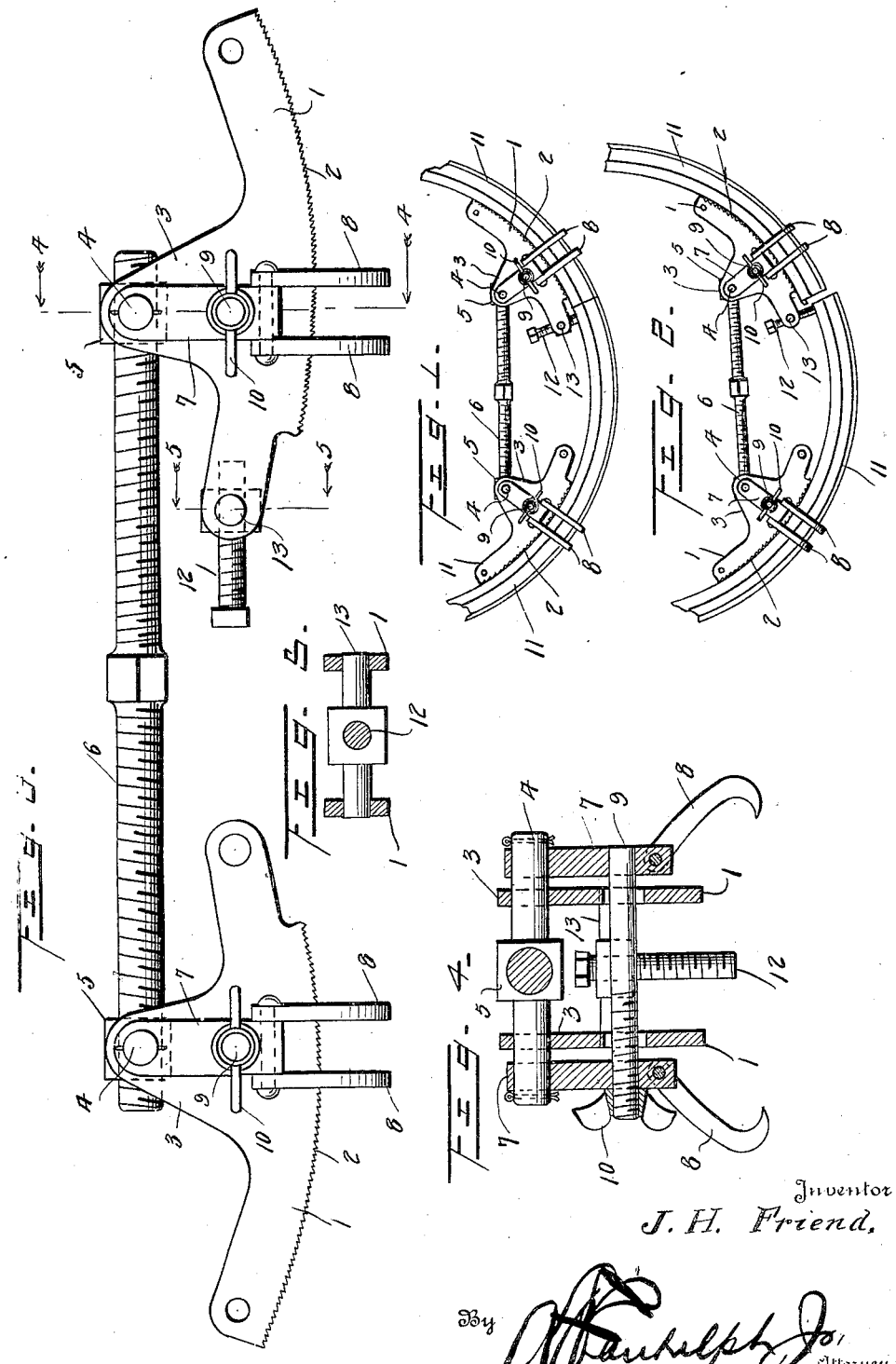

1,492,445

UNITED STATES PATENT OFFICE.

JACOB H. FRIEND, OF CHARLESTON, WEST VIRGINIA.

RIM TOOL.

Application filed August 4, 1923. Serial No. 655,684.

*To all whom it may concern:*

Be it known that I, JACOB H. FRIEND, a citizen of the United States, residing at Charleston, in the county of Kanawha and State of West Virginia, have invented certain new and useful Improvements in Rim Tools; and I do hereby declare the following to be a full, clear, and exact description of the invention, such as will enable others skilled in the art to which it appertains to make and use the same.

The invention has relation to a tool for expanding and contracting a demountable rim of the split type and which is contracted to admit of a tire being easily placed in position thereon or removed therefrom, and which is expanded when the tire is mounted thereon and inflated.

The object of the invention is the provision of a tool which may be readily and conveniently applied to the rim and manipulated to contract and expand the same as required in the mounting and the demounting of the tire.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application:

Figure 1 is a side view of the tool showing it in operative position, end portions of the rim bordering upon the split being shown, Figure 2 is a view similar to Figure 1, showing the ends of the rim separated and disalined preliminary to contraction of the rim to admit of placing a tire thereon or removing the same therefrom, Figure 3 is a side view of the tool showing the parts on a larger scale, Figure 4 is a transverse section on the line 4—4 of Figure 3, looking in the direction of the arrows, and Figure 5 is a sectional detail on the line 5—5 of Figure 3, looking in the direction of the arrows.

Corresponding and like parts are referred to in the following description and designated in the several views of the drawings by like reference characters.

The tool comprises similar or like rim gripping members each comprising a pair of rim engaging plates 1 and a clamp. The rim engaging plates 1 are elongated and longitudinally curved, the gripping edges being toothed, as indicated at 2, to prevent slipping and insure firm and positive engagement with the rim. Each of the plates 1 has an extension 3 intermediate its ends and a pin 4 passes loosely through openings formed in the outer ends of the extensions in transverse alinement. The connecting pin 4 is provided intermediate its ends with a nut 5 in which is mounted a right and left threaded screw 6 which functions to draw the rim gripping members together or move them apart as required in the operation of the tool.

The clamp is mounted upon the pin 4 and comprises plates 7, hooks 8, a screw threaded pin 9 and a nut 10. The hooks 8 are adapted to engage the rim and are pivoted to the plates 7.

The threaded pin 9 projects from one of the plates 7 and passes loosely through the rim engaging plate 1 and the other hook carrying plate 7 and its projecting end receives the nut 10, which is winged for convenience of being operated by hand. By reason of both pins 4 and 9 engaging the plates 1 and 7, the latter are maintained in predetermined position.

The numeral 11 designates end portions of a demountable rim of the split variety. When using the tool, the gripping members are placed against the inner side of the rim, the one adjacent the split so as to overlap the joint and the other a short distance from the split, as indicated most clearly in Figures 1 and 2. The gripping members are retained in place by engaging the hooks 8 over the side flanges of the rim. After the tool has been placed in position, the right and left threaded screw 6 is rotated to effect a separation of the rim, as indicated most clearly in Figure 2, and the separated ends are disalined by means of a screw 12 which is threaded into a pin 13 loosely mounted in the end of the plate 1 overlapping the joint of the rim. After the ends of the rim have been disalined and the screw 6 rotated to permit said ends sliding by each other in the contraction of the rim, the screw 12 is turned to clear the rim. After the rim has been sufficiently contracted, the tire thereon may be removed and another tire placed in position, after which the screw 6 is rotated to expand the rim and when the ends thereof clear each other they automatically aline by reason of the resiliency of the rim and its tendency to assume a normal position. The tool is easily removed by disengaging the hooks 8 from the rim.

What is claimed is:

1. A rim tool comprising similar rim gripping members each comprising a pair of rim engaging plates having their biting edges toothed and longitudinally curved, a pin passing through the rim engaging plates and having a centrally disposed nut, plates mounted upon the ends of the pin, hooks pivoted to the last mentioned plates, a pin projecting from one of the hook carrying plates and passing loosely through the rim engaging plates and the other hook carrying plate and having its projecting end threaded, a nut mounted upon the threaded end of the pin, a right and left threaded screw connecting the rim gripping members by engaging the connecting pins thereof provided with the centrally disposed nut, and a rim alining and disalining screw carried by one of the rim gripping members.

2. A rim tool comprising similar rim gripping members each comprising a pair of rim engaging plates having their biting edges toothed and longitudinally curved, a pin passing through the rim engaging plates and having a centrally disposed nut, plates mounted upon the ends of the pin and provided with rim engaging elements, a draw means connecting the last named plates and passing loosely through the rim engaging plates, a right and left threaded screw connecting the rim gripping members by engaging the connecting pins thereof provided with the centrally disposed nut, and a rim alining and disalining screw carried by a pin loosely mounted between a pair of said rim engaging plates.

In testimony whereof I affix my signature in presence of two witnesses.

JACOB H. FRIEND.

Witnesses:
    LEROY ALLEBACH,
    VERGIE LEE BROWN.